March 5, 1935.  E. F. MILTENBERGER  1,993,519
ROLLER CONVEYER
Filed June 1, 1933
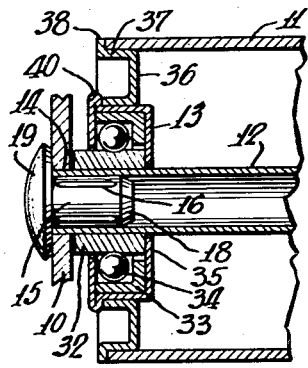
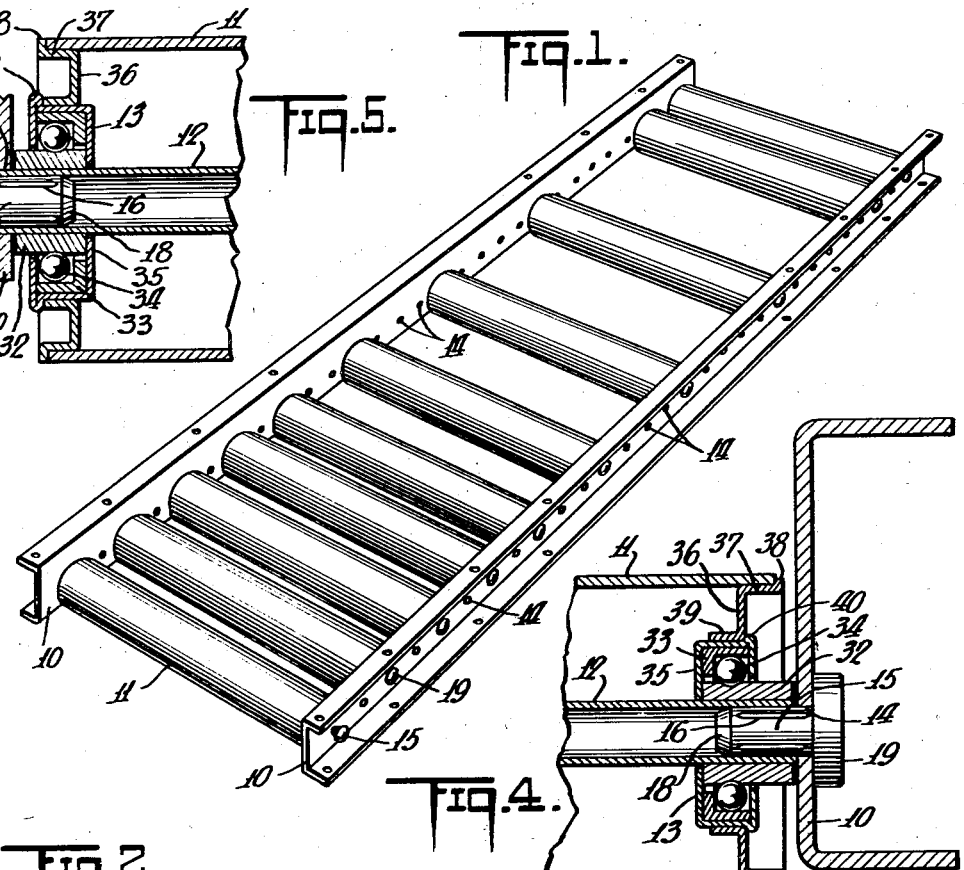
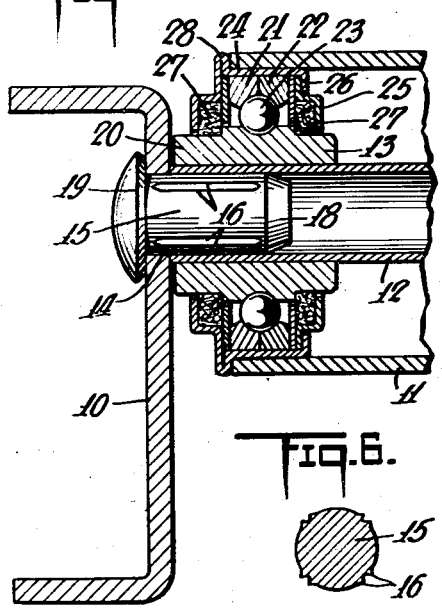
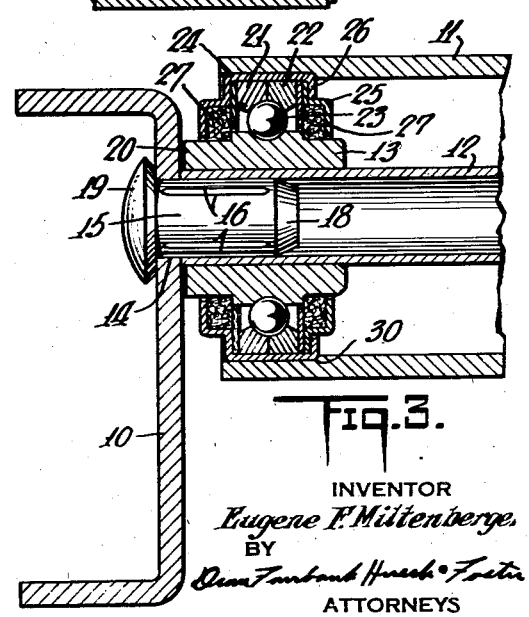
INVENTOR
Eugene F. Miltenberger,
BY
ATTORNEYS Patented Mar. 5, 1935

1,993,519

UNITED STATES PATENT OFFICE 1,993,519

ROLLER CONVEYER

Eugene F. Miltenberger, Red Bank, N. J.

Application June 1, 1933, Serial No. 673,825

4 Claims. (Cl. 308—20)

This invention relates to improvements in roller conveyers of the type in which there are provided a series of rollers for supporting the articles, and facilitating their transportation from one place to another.

The main object of the present invention is to provide a roller conveyer and mounting means therefor, which may be manufactured with accuracy at low cost, which will withstand hard usage, which involves the minimum number of parts, which may be easily and quickly assembled without the use of any special tools, and which may be readily disassembled when desired, for instance for renewal of or repair to any of the parts thereof.

As the main feature of the invention, the axles are hollow, and bolts are provided which are inserted through the side rails from the outer sides of the latter and have a driving fit into the ends of said hollow axles for rigidly securing said axles and said side rails together.

As a further feature, the axles have the ends thereof abutting the inner sides of the rails, so that the axles may be inserted in position between rigidly supported side rails, and may be readily removed for replacement or other purpose. This is highly advantageous especially in cases where the restricted spaces on the sides of the conveyer do not permit the slipping of the axles longitudinally through the side rails.

As another feature, the bolts are so shaped as to expand the end portions of the axle, thereby firmly holding against axial movement the inner races of the anti-friction bearings which support the end portions of the roller. For that purpose, the locking bolts are preferably swaged to form one or more projections which act to expand the end portions of the axle when the bolts are driven into position.

The parts which make up my improved roller conveyer are of such form that they may be manufactured at low cost and assembled with very little manipulation except the hammering of a few bolts.

In the accompanying drawing, there is shown for the purpose of illustration, a few embodiments of my invention. In the drawing:

Fig. 1 is a perspective view of a portion of a multiple roller conveyer constructed in accordance with the present invention.

Figs. 2, 3, 4 and 5 are sections showing different embodiments of the present invention and the application of the invention in conjunction with different forms of anti-friction bearings, and Fig. 6 is a cross-section of a locking bolt.

The conveyer includes a pair of side frame members or rails 10 which may be of any suitable form, as for instance in the form of a channel as shown, and which support a plurality of roller units therebetween, each unit comprising a tubular roller 11 connected to an axle 12 by means of anti-friction bearings 13.

As an important feature of the present invention, each side rail 10 is provided with a series of apertures 14, and the axles 12 are hollow and positioned between the side rails in alinement with a pair of oppositely disposed apertures. Bolts 15 are provided, which project through said side rails and into the ends of the hollow axle 12 for securing said axle in position between said rails.

In the forms shown in Figs. 1 to 4, the axle 12 has the ends thereof abutting the inner sides of the side rails 10 and has an internal diameter substantially equal to the diameters of the apertures 14 of the side rails 10.

As far as some of the broader aspects of the invention are concerned, the axle 12 need not abut the side rails 10. For instance, in Fig. 5 is shown a construction in which the axle 12 passes through the side rails 10 and has its outer ends in the same plane as the outer sides of the rails 10.

The bolts 15 are so shaped as to expand the end portions of the axle so as to firmly secure said axle in position, and to hold the anti-friction bearings 13 and the rollers against axial or vibratory movement. Preferably, the bolts are swaged to form a series of ridges 16 extending longitudinally therealong, so that the driving of the bolts through the side rails into the end portions of the axle causes said end portions to be expanded radially outwardly or deformed by said projections.

The bolts 15 are preferably provided with frusto-conical end portions 18 to facilitate their insertion into the hollow axle, and with heads 19 which engage the outer sides of the side members 10, and which limit the inward axial movement of these bolts when they are hammered into position. These heads also serve to facilitate the removal of these bolts, this removal being effected by inserting a tool between the heads 19 and the outer sides of the side rails 10.

The anti-friction bearings between the roller 12 and the axle 11 may be of any suitable construction. Preferably, they are permanently preassembled as a lubricant containing bearing unit at the place of manufacture, so that they can be shipped as a unit and can be easily and quickly fitted in operative position. The unit in Fig. 2 comprises an inner race ring 20 fitted on the axle 12 and cooperating with a pair of rings 21 and 22 which conjointly serve as an outer race for a series of bearing balls 23. The two rings 21 and 22 are confined and retained in position by means of a casing which includes a jacket 24 engaging the outer peripheries of these rings, and an end cap 25 held in position behind the end flange 26 formed in the end of said jacket.

In order to store lubricant to protect the bearing balls 23 against the abrasive action of objectionable gritty substances, the ends of the bearings may have sealing devices in the form of washers 27 made of absorbent material such as felt, and retained under compression in the casing.

In order to limit the axial inward movement of the bearing of Fig. 2, the jacket 24 is pinched or spun to form a flange 28 which engages the outer end of the roller 11. In the form shown in Fig. 3, the roller 11 is counterbored to form an axially facing shoulder 30 against which the anti-friction bearing abuts to limit its inward axial movement. In Figs. 2 and 3 the bearings are shown of the heavy duty type and serve as end walls for the roller 11.

In Fig. 4 is shown a conveyer roller in which the bearings do not extend to the inner surface of the roller. In this construction, there is provided an inner race ring 32 and an outer race ring 33 serving to hold therebetween a series of bearing balls 34, the race rings and bearing balls being retained as a unit by means of a jacket 35 having the outer periphery thereof spaced radially inwardly from the roller 11.

The roller 11 is supported on the bearing unit by means of a web 36 having a cylindrical portion 37 engaging the inner periphery of said roller, an end portion 38 extending radially outwardly and abutting the end of the roller to limit the inward axial movement of said web. This web 36 also has a cylindrical portion 39 at the radially inward end thereof firmly engaging the outer periphery of the jacket 35 and engaging a shoulder formed by a radially outwardly extending projection 40 in the jacket 35. In this construction, the cross-section of the web 36 is Z-shaped.

In the construction shown in Fig. 5, the web 36 is substantially U-shaped in cross-section as shown, and has the inner periphery thereof engaging the projection 40 to limit the inward axial movement of the bearing.

The ends of the bearings, as well as the ends of the roller, may be closely juxtaposed to the side rails, but not necessarily in frictional contact therewith.

Having thus described my invention, what I claim as new and desire to secure by Letters Patent is:—

1. In combination, a pair of side rails, each having a series of apertures therethrough, a plurality of tubular axles, each having an internal diameter substantially equal to the diameters of said apertures and having its ends abutting against said side members in alinement with said apertures, rollers mounted on said axles, and locking bolts extending through said side rails from the outer sides thereof and axially into said axles, and having firm frictional engagements with the inner surfaces of said tubes.

2. In combination, a pair of side rails, having apertures therethrough, a tubular roller, a hollow axle for said roller, abutting the inner surfaces of said rails in alinement with said apertures, and having the inside diameter substantially equal to that of said apertures, anti-friction bearings interposed between the end portions of said tubular roller and said hollow axle for supporting said tubular roller in spaced relationship on said axle, and bolts having head portions engaging the outer sides of said side rails and having body portions passing through said side rails from the outer sides of the latter and into the end portions of said axle, and acting to radially expand said end portions, whereby said rollers and bearings are held firmly against axial movement.

3. In combination, a pair of side frame members, a tubular roller extending between said frame members, a hollow axle for said roller, and bolts passing through said frame members and press-fitted into said axle, said bolts being swaged to form a series of ridges extending longitudinally therealong, whereby the end portions of said axle through which said bolts extend are expanded radially outwardly and firm frictional engagement effected between said bolts and said hollow axle, and anti-friction bearing units interposed between said end portions of said tubular roller and said axle.

4. In combination a pair of side frame members, a tubular roller disposed between said members, a hollow axle for said roller, anti-friction bearings interposed between the end portions of said roller and said axle, and fastening members projecting through said frame members and into the ends of said hollow axle for expanding the latter and thereby securing said bearings on said axle and retaining said axle in position, said members having heads engaging the outer sides of said frame members to limit the axial movement of the fastening members and facilitating the withdrawal of said fastening members.

EUGENE F. MILTENBERGER.